July 2, 1946.   C. C. WESTERGAARD   2,403,147
AUTOMATIC WINDING MACHINE
Filed April 22, 1942   11 Sheets-Sheet 4

INVENTOR.
Carl C Westergaard
BY George H. Simmons
att.

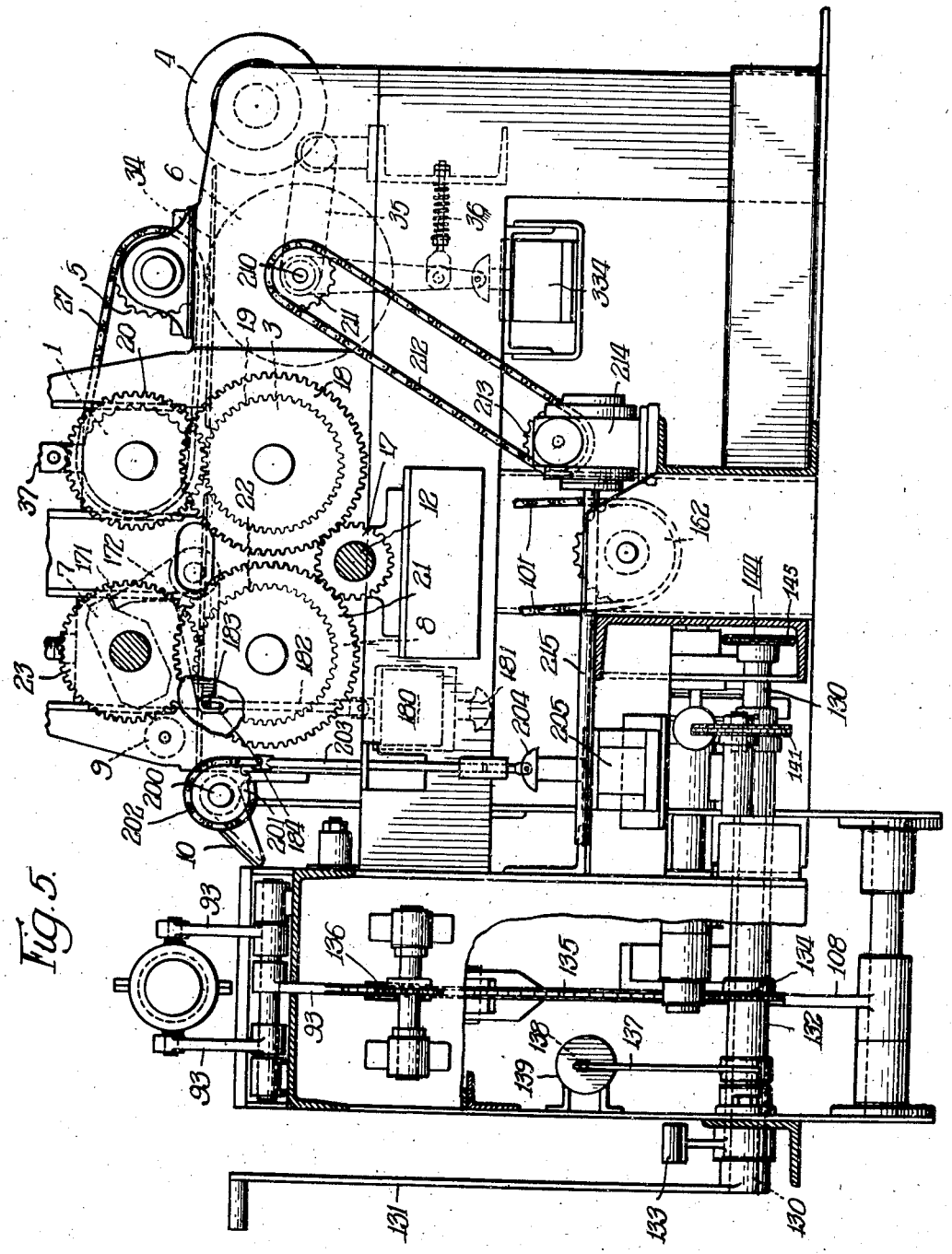

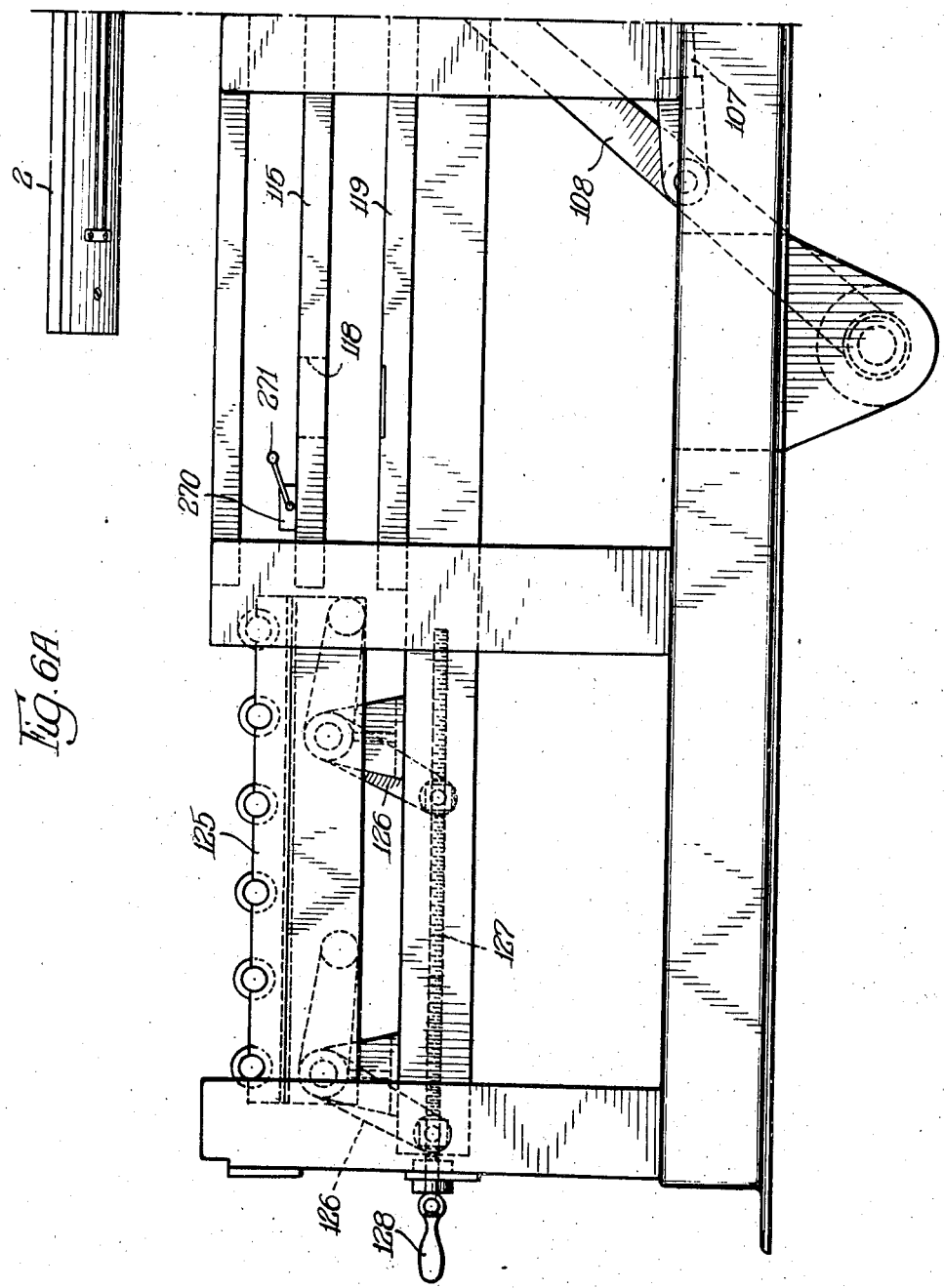

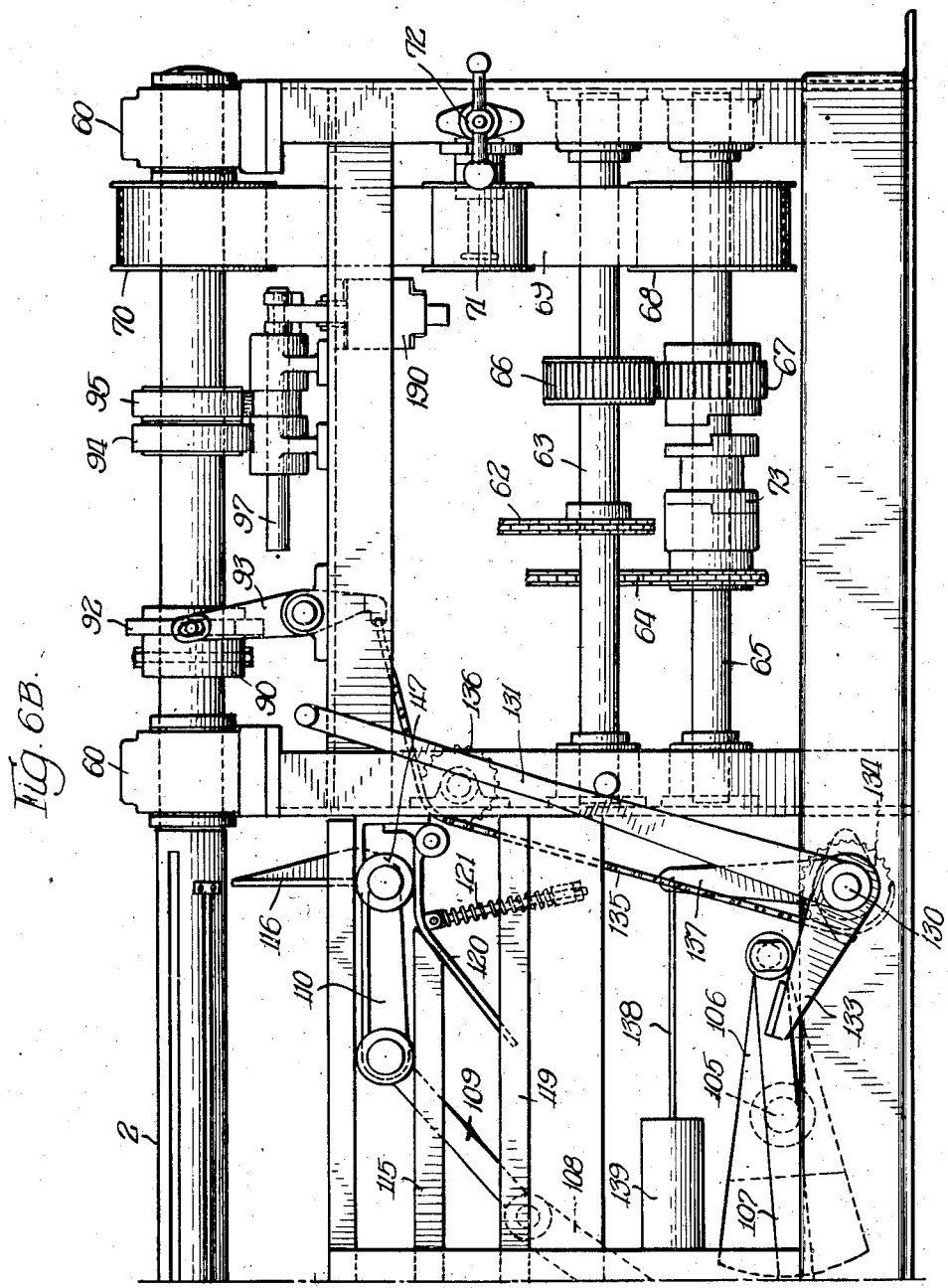

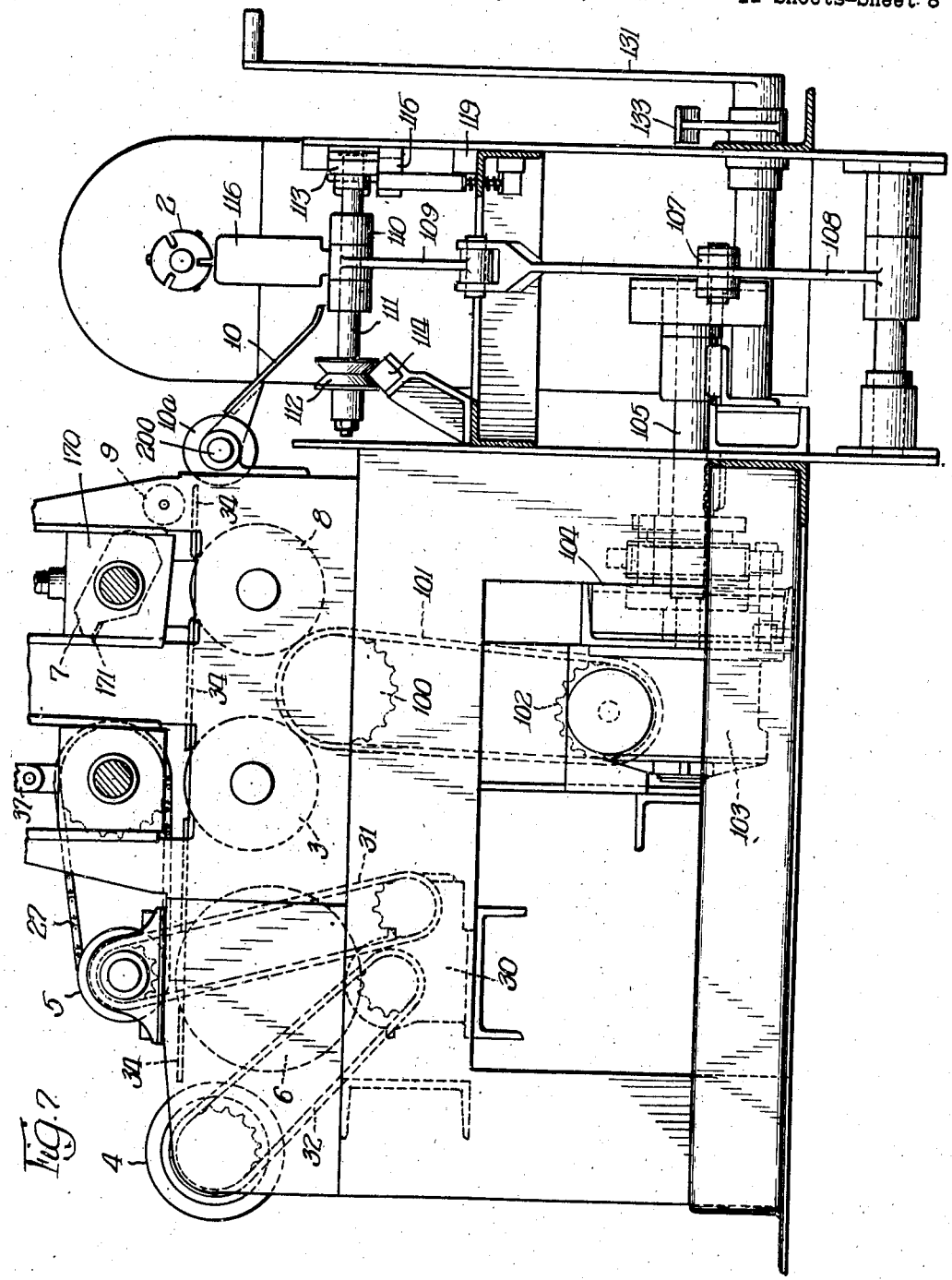

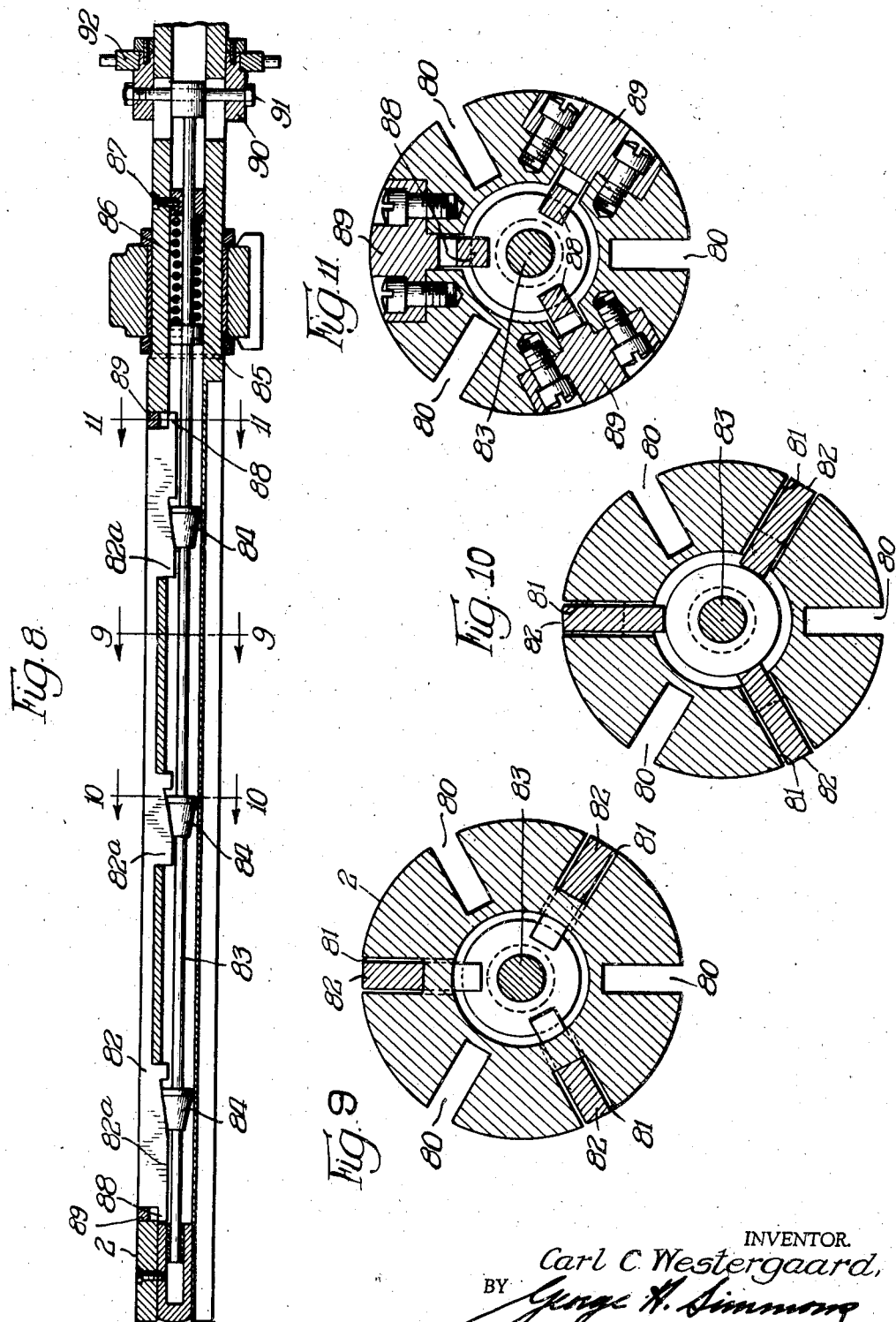

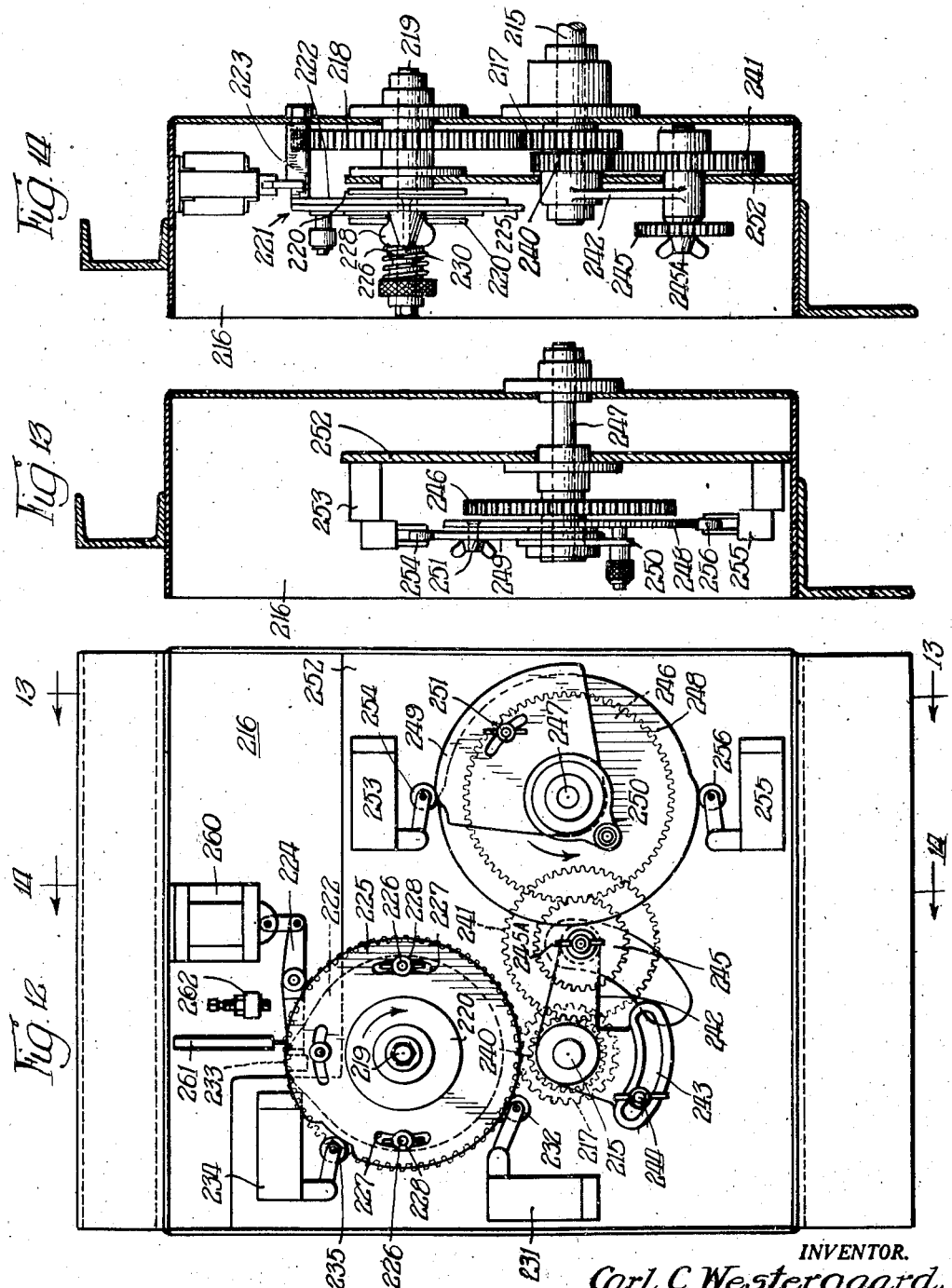

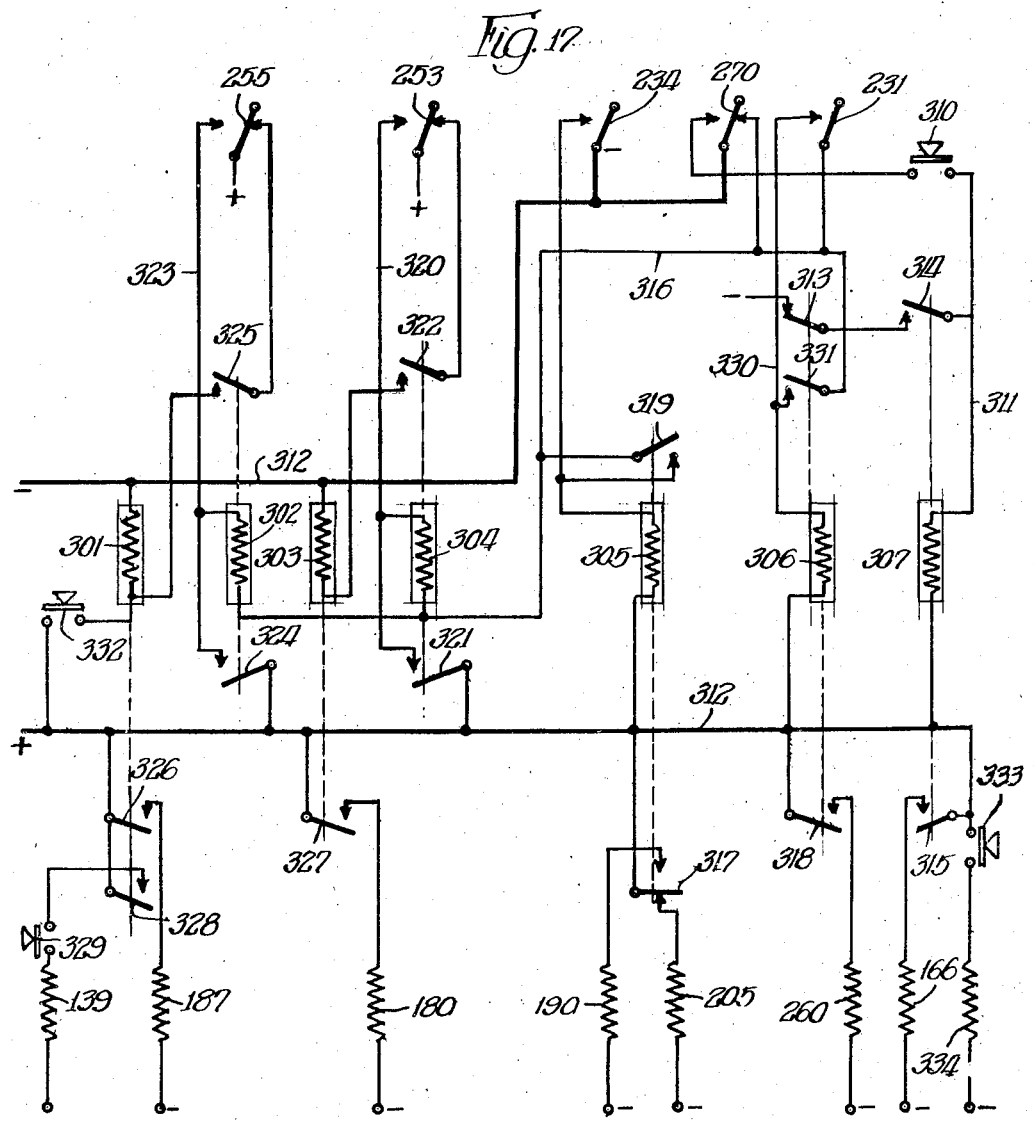

Patented July 2, 1946

2,403,147

UNITED STATES PATENT OFFICE 2,403,147

AUTOMATIC WINDING MACHINE

Carl C. Westergaard, Chicago, Ill., assignor to Reichel & Drews, Inc., Chicago, Ill., a corporation of Illinois Application April 22, 1942, Serial No. 439,975

10 Claims. (Cl. 242—56)

This invention relates to winding machines for sheet material, such as roll roofing, paper and the like, and has for its principal object the provision of a new and improved machine of this type.

It is a main object of the invention to provide a winding machine which will automatically start and wind a roll, measure the length of the same, and, when the required length is in the roll, sever the roll from the web and discharge the completed roll from the machine.

Another object of the invention lies in the provision of a winding machine that may be readily adjustable to wind rolls containing different lengths of materials.

Still another object of the invention lies in the provision of a winding machine containing a stripper mechanism for rapidly removing a completed roll from the winding mandrel.

Still another object of the invention lies in the provision of a winding machine which may be run entirely automatically through its entire cycle, or, if desired, may be run with a portion of the operations of the cycle controlled manually.

Still another object of the invention lies in the provision of a winding machine that is inexpensive to build and maintain and is sufficiently rugged to withstand hard usage over a long period of time.

Further objects of the invention, not specifically mentioned here, will be apparent from the detailed description and claims which follow, reference being had to the accompanying drawings in which a preferred embodiment of the invention is shown by way of example and in which:

Figure 5 is a cross-sectional view showing particularly the drive mechanism and taken substantially along the line 5—5 of Figure 2, looking in the direction of the arrows;

Figure 6A is a front elevational view of the left hand end of the mandrel and stripper mechanism and Figure 6B is a similar view of the right hand end of the mandrel and stripper mechanism drawn to an enlarged scale and with the protective coverings removed;

Figure 7 is an end elevational view, partly in section, taken substantially along the line 7—7 of Figure 2, looking in the direction of the arrows;

Figure 8 is a longitudinal cross-section through the winding mandrel;

Figure 9 is a cross-sectional view taken along the line 9—9 of Figure 8, looking in the direction of the arrows;

Figure 10 is a cross-sectional view taken along the line 10—10 of Figure 8, looking in the direction of the arrows;

Figure 11 is a cross-sectional view along the line 11—11 of Figure 8, looking in the direction of the arrows;

Figure 12 is a front elevational view of the control box;

Figure 13 is a cross-sectional view through the control box, taken substantially along the line 13—13 of Figure 12, looking in the direction of the arrows;

Figure 14 is a cross-sectional view through the control box, taken along the line 14—14 of Figure 12, looking in the direction of the arrows;

Figure 16 is a fragmentary perspective view showing the anvil roll and measuring and slitting devices co-operating therewith; and Figure 17 is a schematic wiring diagram of the electrical control of the machine.

Figure 1:
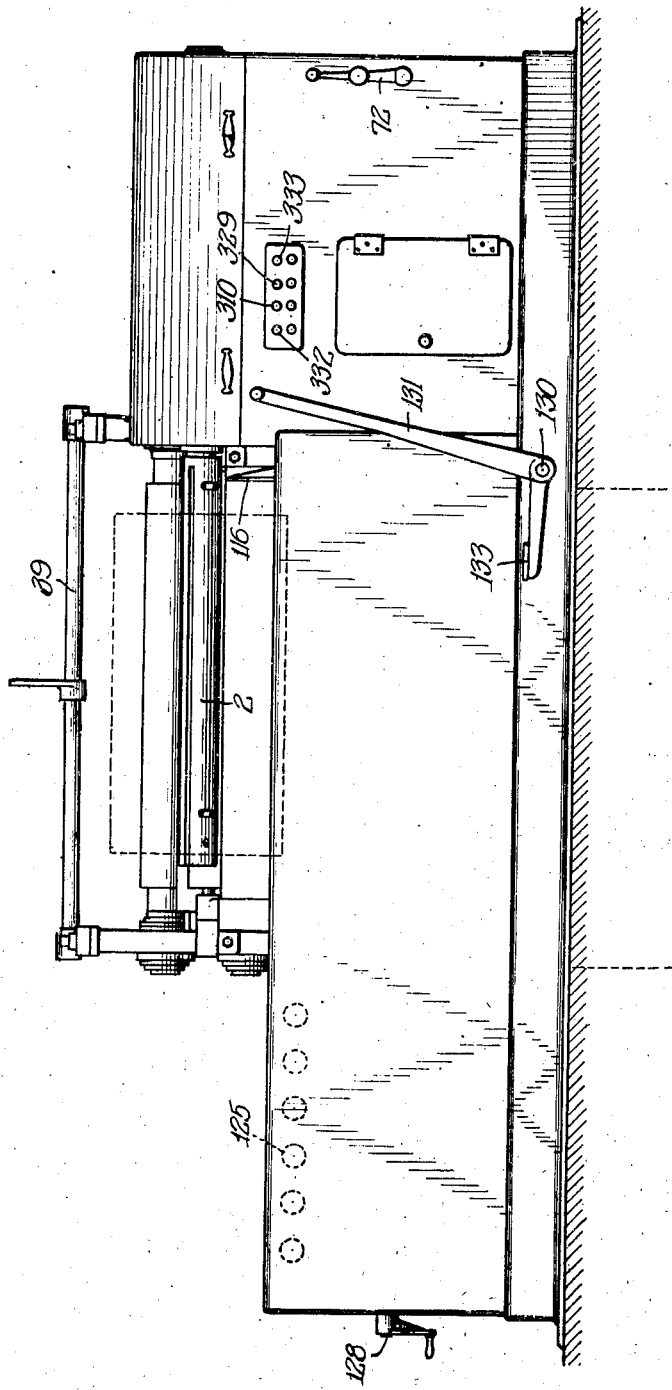
Figure 1 is a front elevational view of a machine embodying the invention and with the protective coverings in place.

In the manufacture of roll roofing, for example, a web of felt, frequently asbestos felt, is passed successively through drying units, impregnating units, coating units and then drying units which together convert the web of raw material into a web of roofing material. The web thus formed is rolled into suitable rolls which are wrapped and labeled for shipment to the consumers. The winding machines used in connection with work of this kind heretofore have contained a mandrel upon which the roll is formed and, when a desired length of web has been rolled in the roll, the machine has been stopped, the roll cut from the web by hand and removed from the mandrel and machine also by hand.

As a result of this mode of operation, the winding machines of the prior art have been so slow that it has been necessary to run the roofing machine, that is, the units for treating, coating and drying the raw felt, at a speed lower than the speed at which they are capable of operating. Furthermore, in an effort to keep up with the roofing machines and because of the length of time required to cut a finished roll from the web and remove that roll from the machine, the winding machines have been run at a very high speed when operating to wind a roll with the result that the lineal speed of the roofing material has been so high as to cause frequent damage to the web and consequent spoilage of the material.

The work of removing the heavy rolls of roofing material, each roll weighing approximately ninety pounds, from the mandrel of the winder is so heavy that only the strongest men have been able to perform this operation and even then these men have required frequent rest periods so that two operators at least have been required for each winding machine.

The present invention seeks to provide a winding machine that will correct the foregoing faults in the prior art machines. To this end, the winding machine is made entirely automatic, that is, a roll is started, automatically wound to the required length and then automatically cut from the web and automatically removed from the winding machine by a suitable stripper mechanism. The time required to sever and remove from the winding machine a completed roll is very materially less than with the prior art machines, and as a result, the winding machine can run at a slower speed; consequently, the lineal speed of the web passing through the machine is reduced and spoilage of that web is lessened. Notwithstanding that the winding machine runs comparatively slower than the machines of the prior art, nevertheless it is fast enough to keep up with the roofing machine even when that machine is running at its maximum speed.

Although the winding machine of the present invention is equipped with full automatic operation, there are times and conditions when certain of the operations can best be controlled manually. The finished rolls stripped from the mandrel of the machine are discharged on to a conveyor leading to the machine that applies to the roll the protective covering and labels used in shipment and in the event of congestion on this conveyor, it may be necessary to delay the stripping of the finished roll from the machine and manual control of this operation can then be substituted for the normal automatic control. Furthermore, if the winding machine is keeping up with the roofing machine, it may be advisable to delay the starting of a new roll so as to permit the roofing machine to build up slack in the web and under these circumstances, the control for automatically restarting the winding machine may be disabled and manual control of this function substituted.

In certain instances roll roofing is slit either on a straight line or an irregular line so that when laid on the roof it may be pulled apart and laid in such a manner to produce the effect of shingles. This slitting may most conveniently be done in the winding machine and the winding machine of the present invention may be equipped for this work, if desired.

Figure 2:
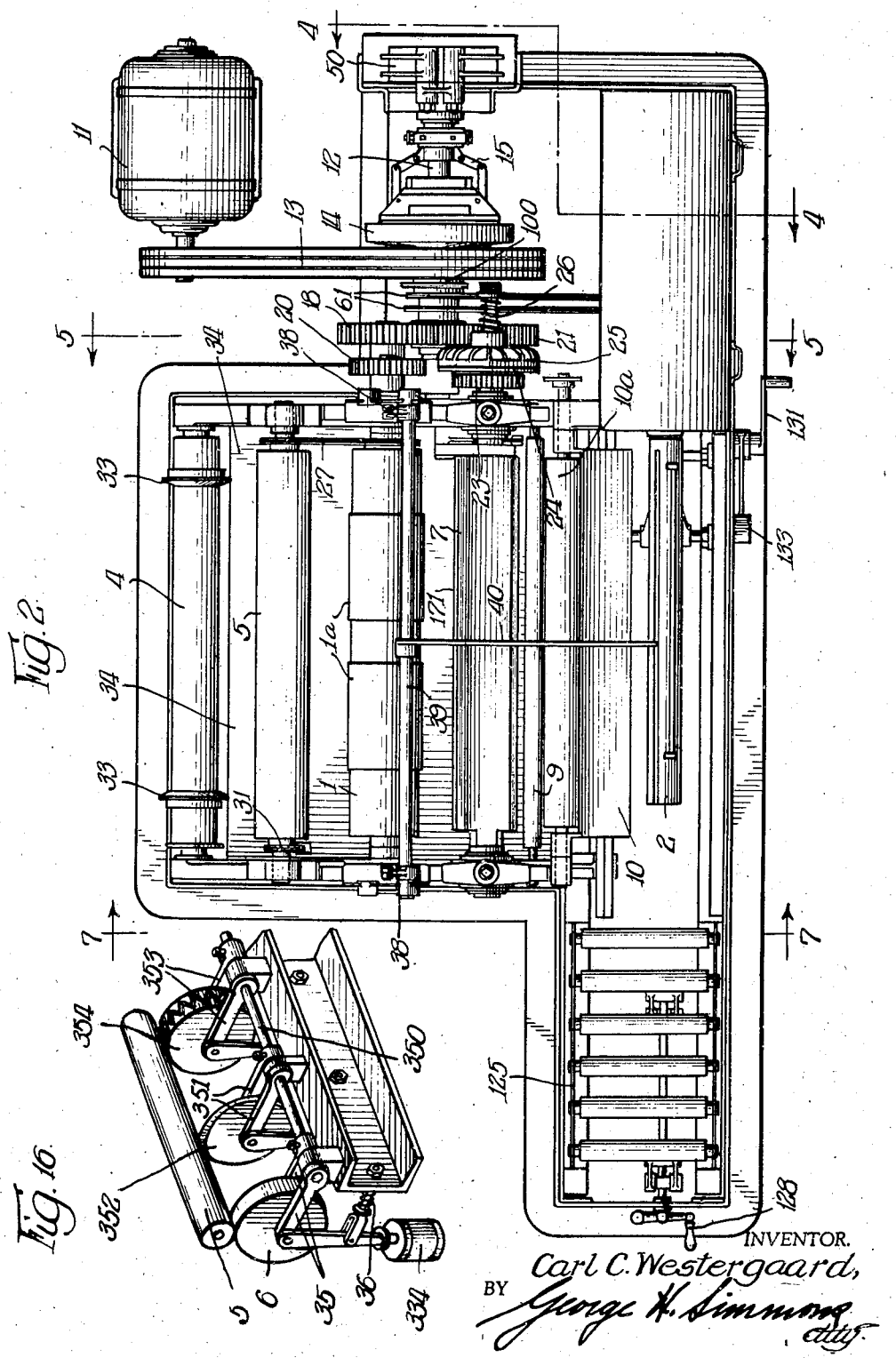
Figure 2 is a plan view of the machine with a part of the protective coverings removed.

Referring now to the drawings in more detail, particularly Figures 1 and 2, it will be seen that the machine of the present invention consists of two main parts, the first the pulling or feeding part located at the back or incoming end of the machine and around the main feed rolls 1 and 3, and the second the winding portion of the machine located at the front or operating side of the machine and around the winding mandrel 2. The machine consists of a suitable frame which in the embodiment shown by way of example is formed of a combination of structural sections such as channels, angles and T's fixed together by welding. The supports for the main bearings and drive rolls are shown as castings. The invention is not so much concerned with the particular manner in which the frame is constructed and the example shown in the drawings may be modified within the teachings of the invention.

Mounted in this frame are the main feed rolls 1 and 3, best seen in Figures 2, 5 and 7, guide roll 4, an anvil roll 5 with a measuring wheel 6 engaging the same, a knife 7 and platen roll 8 co-operating therewith, an idler roll 9 and an apron 10 for guiding the web from the feeding to the winding portion of the machine.

Figure 3:
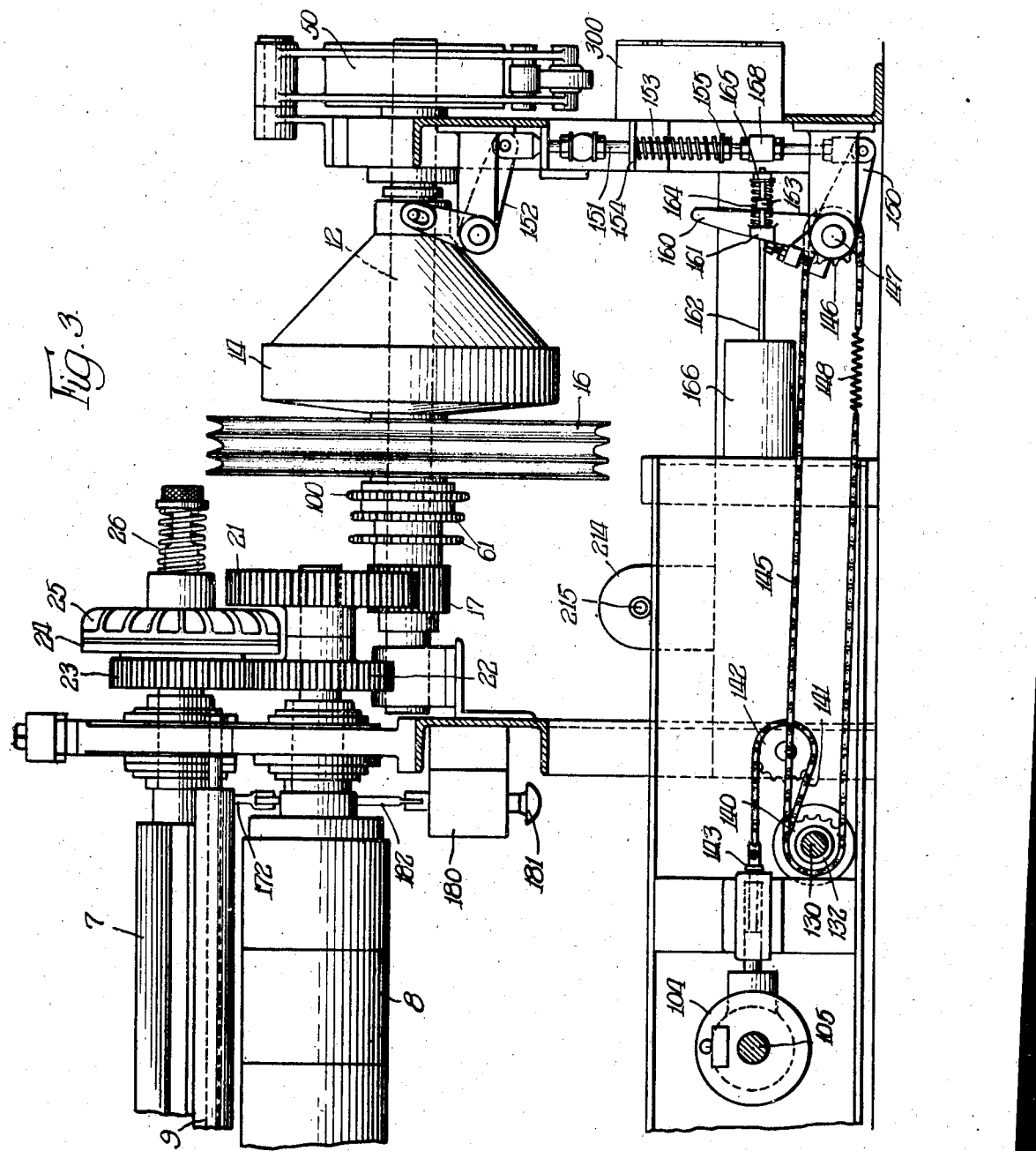
Figure 3 is a fragmentary elevational view showing particularly the main drive of the machine.

Power for driving the machine originates in a suitable source of power, such as the motor 11, Figure 2, and is conducted by belts to a main drive shaft 12, Figures 2 and 3, through suitable means, such as the belts 13. Mounted upon the main power shaft 12 is a clutch 14 which may be of any suitable design, the drawings showing a multiple dry plate clutch that is operated into and out of driving relation by toggles 15, Figure 2. The pulley wheel 16 over which the belts 13 are threaded are mounted loosely upon the shaft 12 so that when the clutch is disengaged, the machine may be brought to rest without stopping the motor.

As will be seen best in Figure 5, shaft 12 carries a pinion 17 which is meshed with a gear 18 on the shaft of lower feed roll 3, this shaft also carrying a gear 19 which meshes with a gear 20 on the shaft of upper feed roll 1, so as to drive the feed roll 1 at the same speed as and in a direction opposite to the rotation of the feed roll 3. Pinion 17 also meshes with a gear 21 on the shaft of platen roll 8, this shaft 8 also carrying a gear 22 which meshes with gear 23 of the knife assembly. Gear 23 is loosely mounted upon the shaft of the knife assembly and is fixed to the one plate 24, Figure 3, of a slip clutch, this plate being engaged by a companion plate 25 held thereagainst by the tension of spring 26. Plate 25 is keyed to the knife shaft.

Feed roll 1 carries a sprocket around which is threaded a chain 27 which extends around a sprocket on the shaft carrying anvil roll 5 so as to drive the roll 5 in the same direction and at a peripheral speed slightly below that of the feed roll 1.

In the preferred embodiment of the invention, the shafts of all power driven rolls are supported in suitable low friction bearings, either ball or roller bearings, encased to protect them from dust and dirt and filled with oil to provide for lubrication of the bearing. Control rods and shafts which are not subjected to such heavy work may be supported in suitable bronze or brass bushings or low friction bearings may be used, if desired.

Mounted on the frame beneath the roll 5 is a gear reduction box 30, best seen in Figure 7, which is driven by a chain 31 that encircles a sprocket on the shaft of roll 5. Leading out of the gear reduction box 30 is a shaft upon which is mounted a suitable sprocket around which a chain 32 is threaded, that chain also extending around a sprocket on the shaft of guide roll 4. The particular type of speed reduction gearing 30 is not of the essence of the present invention, it being suffiand 4, one of which cams being engaged by pawl 96 that is fixed upon a shaft 97 carried on the frame of the machine. With the pawl 96 engaging cams 95, the mandrel will be stopped with one of the slots 80 therein aligned with the apron of the machine for a purpose which will hereafter be explained. The belt 69 by which the mandrel is driven is set loose enough so as to slip readily on its pulleys 68 and 70 when the mandrel is stopped. When the direction of the rotation of the mandrel is reversed, cams 94 and 95 are moved so as to bring the other cam into engagement with the pawl so as to permit stopping the mandrel with the slots 80 aligned with the apron.

The mandrel 2 by its symmetrical construction is balanced so that even when revolving at high speeds will run true. Since the mandrel is composed of a solid member pierced only by mortises through which tongues 82a extend, the centrifugal force set up by high speed rotation is resisted by the mandrel without danger of exploding. Furthermore, since the mandrel is solid with the exception of these mortises which are snugly filled by the tongues 82a, the cams and mechanism within the mandrel are protected from slate or grit that may fall off of the web of material during the winding of a roll. All slots in the mandrel not filled with co-operating members open radially outwardly so that foreign particles falling into the slots will be thrown clear of the mandrel by centrifugal force.

As will be seen best in Figures 3, 5, 6A, 6B and 7, the main shaft 12 of the machine carries a sprocket 100 which is loosely mounted upon the shaft and fixed with respect to the pulley wheels 16 so that this sprocket is revolved continuously so long as the motor is in operation even though the clutch 14 be disengaged and the remainder of the machine brought to rest. A chain 101, Figures 5 and 7, encircles a sprocket wheel 100 and is threaded around the sprocket wheel 102 of the reduction gear mechanism 103 of a single revolution clutch 104 that is located on the frame of the machine beneath the main drive rolls. The particular type of reduction gear mechanism and single revolution clutch is not of the essence of the present invention, it being sufficient that such mechanism have a shaft 105 which will be revolved through one revolution each time the clutch mechanism is tripped. As will be seen best in Figures 6A and 6B, this shaft 105 carries at its outer end a counter balanced bellcrank 106 to which is connected a link 107, the opposite end of which is connected to a lever 108 pivoted to the frame of the machine and connected at its upper end by suitable linkage 109 to a stripper mechanism 110.

As will be seen in Figures 6A, 6B, 7 and 15, the stripper mechanism consists of a main shaft 111 that supports wheels 112 and 113 that engage tracks 114 and 115 respectively. Pivoted to this shaft is the mechanism 110 which is generally L-shaped and contains an upwardly extending arm 116 that is adapted to engage the end of a finished roll. A wheel 117 engages the track 115 and supports the arm end of the stripper in horizontal position. When the single revolution clutch is operated, lever 108 is moved first to the left, Figures 6A, 6B, moving the stripper to the left along tracks 114 and 115. When the member 116 has pushed the finished roll completely off of the mandrel 2, wheel 117 falls through the slot 118 in the track 115, permitting the stripper 110 to rotate in a clockwise direction around shaft 111, thereby moving member 116 down below the rails 114 and 115. Wheel 117 falls into engagement with a lower track 119 and during the last half of the revolution of the shaft 105, lever 108 is moved to the right to return the stripper to its normal or home position.

Pivotally mounted upon the frame of the machine is a cam 120 which is engaged by the wheel 117 upon the return stroke of the stripper, the cam moving down against the tension of spring 121. When the wheel 117 moves past the end of track 115, spring 121 pushes cam 120 upwardly, thereby rotating stripper mechanism 110 in a counterclockwise direction around the shaft 111, Figure 6B, into the position in which it is shown in solid lines. Shaft 105 comes to rest at the end of its operation, having thus positioned the stripper for its next operation.

In certain instances, it may be preferable to return the stripper 110 to its home position without dropping the roll engaging arm 116 thereof below the plane of track 115. This can be done by inserting in the slot 118 of the track 115, Figure 15, a plate 118' whereupon the stripper will be maintained in the position in which it is shown in Figure 6B rather than dropping down with roller 117 engaging track 119. If the machine is to be operated in this manner at all times, cam 120 and spring 121 can be omitted and track 115 extended instead. By suitable proportioning of the gear ratio by changing the relative number of teeth on sprockets 100 and 102, Figure 7, the speed of the stripper mechanism can be increased so as to insure that it will be back to its home position before the new roll has been built up on the mandrel sufficiently to interfere with the return movement of the stripper. The machine shown in the drawings by way of example provides for dropping the stripper as heretofore explained; however, it is contemplated this mode of operation may be modified within the teachings of the invention.

Located on the frame of the machine is a conveyor 125 containing a plurality of free running rollers onto which the finished roll is discharged by the stripper mechanism. Conveyor 125 is mounted upon bellcranks 126 which may be rotated by screw 127 through an operation of the crank 128 to raise or lower the conveyor so as to accommodate it to rolls of various diameter, the conveyor preferably being positioned so that the rolls slide onto the conveyor and not dropped thereon.

Oftentimes it is desired to slit a roll of building material to form a zig-zag edge thereon so that when the roll is separated and laid, a shingle-like appearance will result. The machine of the present invention may be equipped with slitter devices, if desired.

As will be seen in Figure 16, the anvil roll 5 against which measuring roll 6 is maintained by spring 36, may also serve as an anvil against which the slitters may be worked. Measuring wheel 6 is supported upon a shaft 350 by arms 35, which shaft may also carry arms 351 at the free end of which a disk-cutter 352 is rotatably supported. Arms 351 are urged upwardly to maintain cutter 352 in engagement with the anvil by a spring extending between a projection of the arm 351 and the frame member and similar to spring 36. Shaft 350 may carry a plurality of such arms, as indicated by a second pair of arms 353 which support a cutting disk 354 shaped to cut a zig-zag line in the web, thereby to permit simulating diamond point shingles when the roll is laid. Arms 351 and 353 are movable longitudicient that the gearing be capable of driving the roll 4 at a speed much slower than the speed of the main feed rolls of the machine and in a direction opposite to the direction of travel of the main feed rolls in engagement with the web. Mounted upon the guide rolls 4 are adjustable flanges 33 which are brought into snug engagement with the edges of the web as that web enters the machine. Since the direction of travel of the roll 4 is against the direction of travel of the web, the wear on the flanges will be distributed uniformly over the flanges and, consequently, the engagement of the flange with the edge of the web can be more definite than would be possible if the flanges were stationary.

As will be seen best in Figures 2 and 7, a plate 34 extends across the machine from side frame to side frame and between the rolls therein, this plate being provided with slots or openings through which the rolls, chains and levers project. This plate serves to support the web between the rolls and to guide the same therebetween during threading of the machine.

The measuring wheel 6, Figure 5, is supported on arms 35 which are pivoted to a member of the frame of the machine, the roll being held in engagement with the web by a spring 36 that urges the measuring roll upwardly. Thus it will be seen that the web in entering the machine, passes over the guide roll 4 and between the flanges 33 thereon, thence between the measuring roll 6 and anvil roll 5, thence between the feed rolls I and 3. It will be noted that feed roll I is mounted in bearings that may move vertically in the frame, and that links 37 are attached to these bearings and to suitable bell-cranks 38 on shaft 39, Figures 1 and 2, located at the top of the machine. A hand lever 40 is keyed to this shaft and is operable to move the feed roll I away from the feed roll 2 to permit threading the web therebetween. The web continues over the platen 8 under the idler roll 9 and over the apron 10 to the winding mandrel of the machine.

Feed rolls I and 3 may be equipped with bands Ia, Figure 2, which form a high friction engagement with the web so that as the rolls are rotated, the web will be pulled through the machine. Bands Ia may be composed of a rubberized fabric or other similar material capable of pulling the web without damaging the same. Measuring wheel 6 preferably is surfaced with a similar material so that as the web passes over the wheel it will rotate the wheel.

Figure 4:
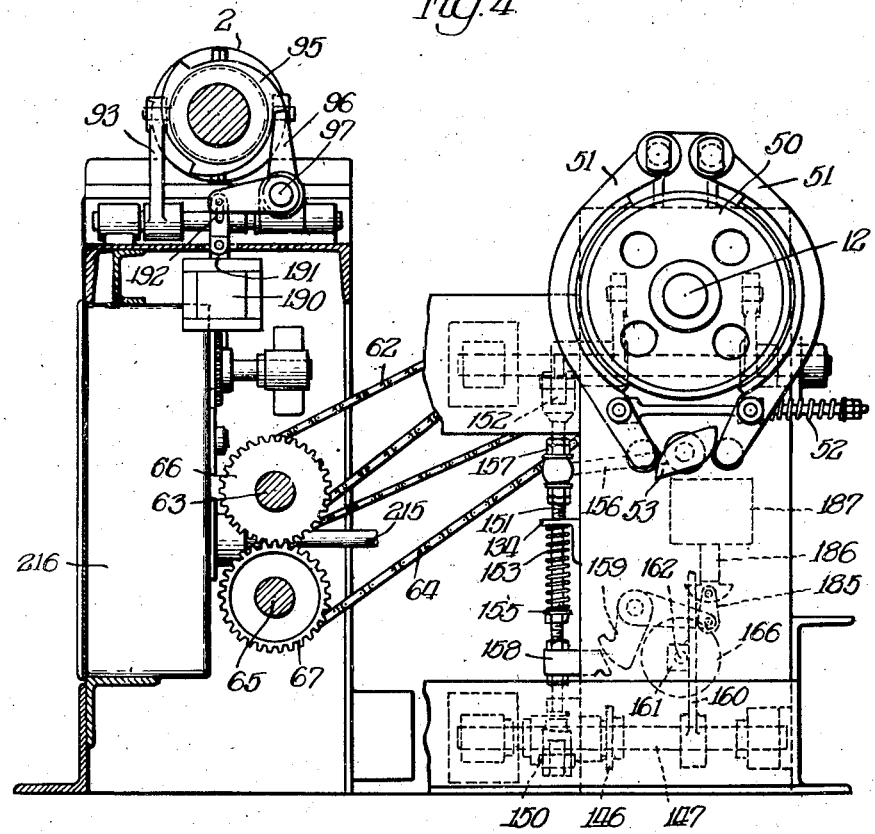
Figure 4 is an end elevational view taken substantially along the line 4—4 of Figure 2, looking in the direction of the arrows.

As will be seen best in Figures 2, 3 and 4, the main drive shaft 12 of the machine carries at its outer end a brake drum 50 which is engaged by brake shoes 51 that are held thereagainst by spring 52. A cam 53, operated simultaneously with the operation of the clutch toggles, as will hereafter appear, moves the shoes 51 away from the brake drum to free the main drive shaft for rotation. When the clutch is operated to disconnect the source of power from the machine, cam 51 moves into the position in which it is shown in Figure 4 to permit spring 52 to move the brake shoes into engagement with the brake drum and thereby bring the shaft to rest.

As will be seen best in Figures 3, 4, 6A and 6B, the mandrel 2 of the machine is supported in suitable bearings 60 that are located upon the forward portion of the framework of the machine. The main drive shaft 12 carries a pair of sprockets 61, Figure 3, around one of which is threaded a chain 62 that encircles a sprocket on a shaft 63 that is supported in suitable bearings in the frame beneath the mandrel. The other sprocket 61 is encircled by a chain 64 which encircles a sprocket on a shaft 65 which is parallel to the shaft 63. Gears 66 and 67 connect shafts 63 and 65 together, gear 66 being keyed to shaft 63 and gear 67 being loosely mounted on shaft 65. Shaft 65 also carries a pulley 68 over which is run a suitable belt 69 that encircles a pulley 70 on the mandrel 2. An idler pulley 71 engages the belt, being mounted for movement away from and towards the belt by a handle 72 so as to tighten and loosen the belt as may be required.

Roll roofing specifications most generally require that the surface of the roofing material which is to be ultimately exposed to the weather be rolled inside of the roll, thereby facilitating laying since the end of the roll can be secured and the roll rolled along on the roof to pay out the material. Certain types of roofing, however, are rolled the opposite way, that is, with the surface that is to be exposed to the weather disposed outwardly of the roll. Chains 62 and 64 being both driven by the main drive shaft 12 are moving in the same direction. The sprocket around which chain 64 is run is mounted loosely on shaft 65. Keyed to this shaft and movable into and out of engagement with this sprocket is a clutch collar 73. With the collar in the position in which it is shown in Figure 6B, the mandrel 2 will be driven through chain 64 in one direction. With the collar 73 moved to the right to disengage it from the sprocket around which chain 64 extends and into engagement with the gear 67, the mandrel will be driven in an opposite direction through chain 62 and gears 66 and 67 in the obvious manner. Thus it will be seen that the mandrel may be driven in either direction as required.

As will be seen in Figures 8 to 10 inclusive, the mandrel 2 which is a hollow tube-like member, contains a plurality of slots 80 extending radially inwardly partly through the walls of the mandrel. These slots are adapted to receive the leading edge of the web of material to start a roll on the mandrel. Disposed midway between the slots 80 are shallower slots 81 extending substantially from end to end of the mandrel and in which are located spreader bars 82. Leading out of the bottom of the slots 81 are mortises opening into the hollow interior portion of the mandrel and through which tongues 82a on the spreader bars are extended.

Mounted in the hollow central portion of the mandrel and concentrically therewith is a rod 83 that is capable of movement longitudinally of its axis. Carried upon this rod are cams 84 which engage the tongues 82a of the spreader bars 82. Fixed to the rod 83 is a collar 85 against one end of which a spring 86 is abutted, the other end of the spring being abutted against a block 87 so that the spring urges the rod and cams to the left, Figure 8, thereby camming the spreader bars outwardly of the mandrel through tongues 82a. Tongues 82a contain projections or lips 88 and the mandrel is provided with blocks 89 which are fitted over these projections to limit the outward movement of the spreader bars with respect to the mandrel.

Mounted upon the outside of the mandrel is a collar 90 which is attached to the rod 83 by suitable means, such as bolt 91, this collar being grooved to receive a pintled collar 92, the pintles of which engage levers 93 that are pivotally mounted upon the frame of the machine. Mandrel 2 also carries cams 94 and 95, Figures 6B nally of the shaft 350 so that the position of the slits in the web may be varied.

Control mechanism

Mounted near the bottom of the machine is a countershaft 130 to which hand lever 131 is keyed. Surrounding this shaft is a sleeve 132 to which foot pedal 133 is keyed. As will be seen in Figures 5 and 6B, sleeve 132 carries a sprocket 134 to which a chain 135 is fixed, this claim extending over an idler sprocket 136 to the bellcranks 93. When the foot lever 133 is depressed, sleeve 132 is rotated in a counterclockwise direction and through chain 135, bellcranks 93 are rotated in a clockwise direction. This action moves the collars 92 and 90 to the right, Figure 6, thereby moving rod 83 to the right, Figure 8, against the tension of spring 86 to loosen the spreader bars 82 and thereby loosen the roll from the mandrel. Sleeve 132 also carries an arm 137, Figures 5 and 6B, to which is connected the thrust rod 138 of a thruster mechanism 139. This thruster mechanism 139 may be a solenoid or any other mechanism capable of moving the rod 138 to the left, Figure 6B, thereby to rotate the sleeve 132 in a counterclockwise direction the same as if the foot pedal 33 had been depressed.

As will be seen in Figures 3 and 5, sleeve 132 also carries a sprocket wheel 140 to which is fixed a chain 141 that is threaded around an idler sprocket 142 and connected to the trip pin 143 of the single revolution clutch so that a rotation of the sleeve, as above explained, also trips the single revolution clutch to initiate an operation of the stripper mechanism.

Shaft 130 carries a sprocket 144 which is engaged by chain 145 that chain also being threaded around the sprocket 146 on a control shaft 147 that is mounted in the frame of the machine substantially parallel to the shaft 130. The free ends of chain 145 are connected together by spring 148 for a purpose which will presently appear.

Control shaft 147, best seen in Figures 3 and 4, carries a crank arm 150 which is connected by suitable rod 151 to the operating lever 152 of the main clutch toggle mechanism. A spring 153 abuts against a bracket 145 on the frame of the machine and against a collar 155 threaded on a shaft 151 to urge that shaft downward. Lever 156 by which cam 53 is rotated is interposed between threaded collars 157 on the shaft 151. Through this arrangement, when the hand lever 131 is moved to rotate shaft 130 in a counterclockwise direction, Figure 3, shaft 147 is rotated in the same direction and rod 151 moved upwardly to throw the clutch 14 into driving position, and simultaneously to release the brake shoes 51 from the brake drum 50. Shaft 151 carries a link 158 which is engaged by a latch 159 at the end of the upward movement of the rod, thereby to hold the clutch in driving position and the brake in released position. Latch 159 is pivotally mounted upon the frame of the machine.

Control shaft 147 also carries an arm 160 which is provided with an ear 161 through which a rod 162 is projected. Mounted on this rod but spaced away from the ear 161 is a collar 163 and surrounding the rod and the collar is a spring 164 that abuts against the ear 161 and against a collar 165 threaded on the end of the rod. Rod 162 is a rod of a thruster mechanism 166 which can be any desired type of thruster, preferably a solenoid type electro-magnetically operated thruster capable of moving the shaft 162 to the left at a uniform rate of speed.

When the machine is being started, it is preferable that the clutch 14 be engaged slowly so that it may slip through a few revolutions thereby to bring the feed rolls and web up to speed slowly. When the machine is being started through an operation of hand lever 13, the operator will move this lever slow enough to insure proper starting. When the thruster 166 is being used to start the machine, initial movement of the shaft 162 moves the crank arm 160 through the tension of spring 164. This engages the clutch with an initial slight pressure to permit starting the machine with the clutch slipping. As the rod 162 continues in its movement to the left, Figure 3, sleeve 163 is brought into engagement with the ear 161 to complete the engagement of the clutch by moving rod 151 upwardly sufficiently to enable latch 159 to engage with the link 158. The clutch will then operate to drive the machine without slippage.

As will be seen best in Figures 3, 5 and 7, the knife assembly 7 consists of a supporting member 170 mounted upon the knife shaft and carrying the cutting blade 171. Pivotally mounted upon the frame of the machine adjacent the knife is a pawl 172 that engages the knife blade to hold the assembly in fixed position above the moving web during the winding operation of the machine. The clutch by which the knife is driven and comprising plates 24 and 25 is arranged to slip so long as pawl 172 holds the knife against rotation. When the pawl is disengaged, as will be hereafter explained, the knife is driven through this clutch to sever the web by bringing the cutting edge of the knife into engagement with the platen over which the web is then passing.

As shown in the drawings, the knife pawl 172 is moved around its pivotal mounting by a solenoid 180 which when energized moves armature 181 upwardly. A rod 182 connects this armature to the pawl 172, this connection between the rod and the pawl 172 being made by a pin 183 which extends loosely through a slot 184 in the rod 182. The upward movement of the rod imparts a hammer action on the pawl 172 to forcibly move it away from the knife blade 171 against the torque set up in clutch plates 24 and 25, thereby to free the knife for rotation. The speed of rotation of the knife shaft is preferably such that the peripheral speed of the blade 171 is slightly greater than the lineal speed of the web. Since the web is apt to be somewhat tacky because of the materials with which it is treated, it will have a tendency to stick to the knife blade. With the blade moving faster than the web, the blade will pull away from the web after severing it, thereby overcoming the tendency of the web to stick to the blade. Should the web stick to the blade, the leading edge of the web would be carried upwardly by the blade and the machine would have to be rethreaded before a new roll could be started.

Latch 159 by which the main clutch 14 is maintained in driving position is connected by a suitable link 185, Figure 4, to the armature 186 of a solenoid 187. An energization of this solenoid to raise its armature unlatches the rod 151 to permit spring 153 to move that rod downwardly and thereby operate the clutch to disconnect the source of power from the machine. Downward movement of the rod 151 moves cam 53 to permit brake shoes 51 to move into engagement with the brake drum 50, thereby to bring the machine to rest.

As shown in the drawings, particularly Figures 4 and 6B, pawl 96 by which the mandrel is held is operated by a solenoid 190 that is arranged to move its armature 191 upwards when the solenoid is energized. The armature 191 is connected to the pawl 96 by a lost motion connection 192 so that there is a hammer action on the pawl to free it from the cam 95 against the torque placed on that cam by the belt 69. While thrusters 139 and 166 and solenoids 180, 187 and 190 are shown and described as electro-magnetically operated and in the preferred embodiment of the invention are electro-magnetically operated devices, the use of other types of equipment is contemplated within the teachings of the invention. These devices might well be pneumatically operated devices electro-magnetically controlled within the teachings of the invention.

With the winding mandrel held at rest by the pawl 96 through its engagement with the cam 95, one of the slots 80 in the mandrel will be in position to receive the leading edge of the web as the same passes through the machine from the feeding rolls to the mandrel.

The apron assembly 10, as will be seen best in Figures 2, 5 and 7, comprises a roller 10a and an apron 10 pivotally mounted upon the shaft 200 of the roller, the shaft being supported in suitable bearings fixed upon the frame of the machine.

The shaft carries a sprocket 201 around which a chain 202 is wound, this chain being connected to a rod 203 that in turn is connected to the armature 204 of a solenoid 205. When the solenoid is operated, shaft 200 is rotated to bring the apron into substantially a horizontal position, at which time the free end of the apron will be in juxtaposition to the mandrel and in alignment with one of the slots 80 therein. The roller 10a revolves freely on shaft 200 and serves as a guide for the web, particularly when the roll on the mandrel is nearly finished and consequently projects a considerable distance radially outwardly from the mandrel.

As the leading edge of the web is fed forwardly, the apron guides it into the slot where it engages the bottom thereof and a continued forward movement of the web places a slight loop in the web. When the mandrel is started this loop bends the web against the edge of the slot 80 to establish a driving connection between the web and mandrel, thereby to start building up a roll on the mandrel as the same is rotated. Solenoid 205 may likewise be other than the electro-magnetically operation shown and described.

Measuring device

Measuring wheel 6 which is held in engagement with the web by spring 36, Figure 5, is mounted upon a shaft 210 which carries a sprocket 211 around which a chain 212 is threaded and extended to the sprocket 213 of a speed reducing mechanism 214. This particular type of speed reducing mechanism is not of the essence of the present invention.

Leading out of this mechanism is shaft 215 that extends forwardly of the machine to a control box 216 that is located at the forward part of the machine and beneath the mandrel 2. As will be seen in Figures 12, 13 and 14, shaft 215 extends into the box 216 and carries a pinion gear 217 which is engaged with a spur gear 218 that is mounted upon a lay shaft 219. Carried on this shaft between friction plates 220 thereon is a cam assembly 221 which consists of a rear cam 222 that carries a rearwardly extending block 223 that is engaged by a pawl 224 to hold the cam against rotation. A second and forward cam 225 is mounted upon the cam 222 by pins 226 which extend through slots 227 in the cam 225 and are equipped with thumb nuts 228 which may be tightened to fix the cam 225 with respect to the cam 222. Friction disks 220 are spring pressed against the cam assembly 221 by an adjustable spring 230 so that the torque placed on the cam may be regulated as required.

Mounted in the control box is an electric switch 231 having a roller 232 adapted to be moved by the hill 233 of the cam 222, thereby to operate the switch. A second electric switch 234 is equipped with an operating roller 235 that engages cam 225 and is operated thereby.

Shaft 215 also carries a pinion 240 which is meshed with a spur gear 241 that is mounted upon a shaft carried by arm 242 that is pivotally mounted upon the shaft 215. Arm 242 contains a slotted branch 243 through which a bolt 244 is extended, this bolt being equipped with a thumb nut which may be brought up tight to lock the arms against rotation around shaft 215. Mounted on the front side of the arm 242 and keyed to the shaft carrying spur gear 241 is a pinion gear 245 that is fixed upon the shaft in any preferred manner such as by a wing nut 245a. Pinion gear 245 is meshed with spur gear 246 that is mounted upon a lay shaft 247, Figure 13. Also mounted upon shaft 247 are a pair of cams 248 and 249, cam 248 being keyed to the shaft by linkage 250 and cam 249 being fixed to cam 248 by a bolt 251 that extends through a slot in cam 249 and is equipped with a wing nut which may be drawn down tight to lock the two cams together.

Mounted upon a suitable bracket 252 in the control box is an electric switch 253 which has an operating roller 254 that is in engagement with cam 249. Also mounted in the control box is an electric switch 255 which has an operating roller 256 that is in engagement with cam 248. Also mounted in the control box is a solenoid 260, the armature of which is connected to pawl lever 224, there being a spring 261 which pulls this lever upwardly, Figure 12, against stop 262 when the solenoid is deenergized. Switches 231, 234, 253 and 255 may be any one of a number of different types of electrical switches available upon the open market. Switches of the so-called limit switch type have been found satisfactory for this purpose and such switches are shown in the drawings by way of example.

Figure 15:
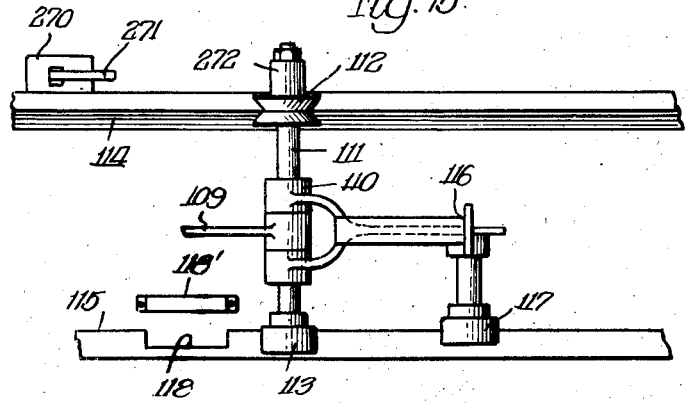
Figure 15 is a fragmentary plan view of the stripper mechanism.

As will be seen in Figure 15, a limit switch 270 is mounted upon the rail 14 in such a position that its operating roller 271 will be engaged by a collar 272 upon the shaft 111 of the stripper mechanism, this limit switch being operated by the stripper mechanism at the end of its movement to remove a finished roll from the mandrel.

Electrical control of the machine

The various solenoids, thrusters and other electromagnetic devices used to control the machine are themselves controlled over circuits opened and closed by relays located in a suitable box 300, Figure 3, disposed on an upright member of the frame below the brake mechanism. The cycle of operation begins when the limit switch 270 is operated at the end of the operation of the stripper in removing the roll from the mandrel. As will be seen in Figure 17, limit switch 270 is a make and break switch and this operation tion by latch 159. At spring 318 relay 306 closes a circuit from positive through solenoid 260, energizing that solenoid which moves cam 224 into the path of block 233 on the cam 222 preparatory holding that cam against further rotation during the remainder of the cycle.

When the required length of material has been wound on the roll, cams 248 and 249 will be moved so that cam 248 operates limit switch 255 to open its normally open contacts and close its normally closed contacts, thereby completing a circuit for relay 301 from positive, through the limit switch and springs 325 through the relay to negative, operating that relay which at spring 326 closes a circuit from positive through the winding of solenoid 187 to negative, operating that solenoid to move latch 159 away from link 158, thereby operating clutch 14 to disengage the machine from the source of power and operating cam 53 to move brake shoes 51 into engagement with the brake drum 50 to bring the machine to rest.

Cam 249 is adjusted with respect to cam 248 so as to operate limit switch 253 either slightly before limit switch 255 is operated or simultaneously with the operation of limit switch 255 or slightly after 255 has operated. This adjustment depends upon the amount of over-run made by the machine after the power has been disconnected and the brake applied.

Movement of limit switch 253 into engagement with its normally closed contact closes a circuit from positive through spring 322 and the winding of relay 303 to negative, operating that relay which at spring 327 closes a circuit from positive through the winding of solenoid 180 to negative, operating that solenoid which removes pawl 172 from its engagement with the knife 7. As the machine is coasting to a stop, knife 7 rotates, severing the web by pressing the same into engagement with the platen 8. The knife must continue to move far enough so that it will come to rest above the web so that the machine can be restarted and as will be seen in Figure 5 a 180° revolution of the knife will be sufficient. By proper adjustment of cam 249 with respect to cam 248, this result can be obtained without difficulty. When this adjustment is achieved, the leading edge of the web will come to rest on apron 10 near the roll 10a thereof from which position it can be restarted without difficulty.

Energization of relay 301 at spring 328 closes a circuit through push button 329 through the winding of thruster 139 to negative. Thruster 139 moves its rod 138 to the left, Figure 6B, thereby operating cranks 93 to move the mandrel cams to the right, Figure 8, so as to withdraw thruster bars 82 from their engagement with the roll on the mandrel to free that roll for removal. Simultaneously, thruster 139 through chain 141 trips the latch 143 on the single revolution clutch, starting that clutch on its cycle of operation to move the stripper 116 longitudinally of the mandrel, thereby to remove the finished roll from the mandrel. At or near the end of the outward movement of the stripper, limit switch 270 is operated and the movement of this limit switch away from its normally closed contact removes negative from holding conductor 316, thereby unlocking relay 302, 304, and 305, which were locked thereto, relay 302 on restoring, opening the circuit of relay 301 to permit that relay to restore and relay 304 opening the circuit of relay 303 to permit that relay to restore. Restoration of relay 301 opens the circuit of solenoid 187 without effect at the moment and the restoration of relay 303 opens the circuit of solenoid 180 to return pawl 172 into the path of knife 7. The cycle of operations of the machine is now completed.

Rolls of different lengths may be wound on the machine, the machine being adjusted to automatically measure and cut the roll of a given length from the web by changing gear 245 in the control box, Figure 12. To do this, wing nut 244 is loosened and arm 242 swung in a clockwise direction to move the gear 245 into the clear, whereupon wing nut 245a is loosened and the gear 243 removed and replaced by a gear having the required number of teeth.

In the embodiment of the invention shown in the drawings, gear 245 has 120 teeth when the machine is set to wind a roll containing 36 lineal feet of roofing, has 86 teeth when the roll is to contain 50 feet and has 30 teeth when the roll is to contain 144 feet. With the proper gear 245 in place, arm 242 is rotated to bring that gear into mesh with gear 247 on the cam assembly 248 and 249.

In the event of an emergency during the winding of a roll, such as for example a break in the web, the operator may bring the machine to rest quickly by operating push button 332 thereby closing a circuit from negative through the winding of relay 301 to positive, operating that relay which at spring 326 closes a circuit for the solenoid 187 to operate that solenoid. If the machine is set for automatic starting of the stripper, the operator will operate switch 329 to open its contacts, thereby preventing starting the stripper in operation.

If during the winding of a roll, the operator notices that there is a faulty place in the web, he may press push button 333, thereby closing a circuit from positive through the winding of solenoid 334. As will be seen in Figure 5, operation of solenoid 334 moves the crank arm 35, on which measuring wheel 6 is mounted, downwardly against the tension of spring 36, moving measuring wheel 6 out of engagement with the web stops the measuring wheel and the faulty web is wound on the roll without being measured. As soon as the fault has thus been passed, push button 333 is released and the measuring wheel returned into engagement with the web, whereupon measuring is resumed. The operator then marks the over-size roll which is removed from the conveyor and unrolled to permit cutting out the faulty portion of the material. Standard specifications permit a limited number of the rolls to be in more than one piece and it is the practice to put in a little extra material when more than one piece appears in the roll, this being done by leaving push button 333 closed a little longer than is necessary to pass the faulty portion of the web.

In a commercial machine protective covers and guards are applied to as many of the moving parts of the machine as possible, as shown in Figure 1, these guards being omitted from the remainder of the figures so as to better show the structures.

As shown in the drawings, the machine has a mandrel and discharging conveyor extending from the left hand side of the machine when viewed from the front or operating side thereof; however, the machine may be built in reverse when it is necessary to extend the conveyor from the right hand side of the machine to fit it into an existing production line.

The winding machine of the present invention is possessed of many advantages. It can be rugmoves its main spring away from its break contact and into engagement with its make contact momentarily.

Assuming now that the machine is set for full automatic operation, push button 310 will be operated to close its contacts, this push button being located in a panel on the front of the machine as will be seen in Figure 1. A circuit is then closed from one side of a source of commercial power, for convenience hereinafter referred to as "negative," through switch 270 and its make contact, through the closed contacts of push button switch 310, conductor 311, through the winding of relay 307 and common conductor 312 to the other side of the source of commercial power, for convenience hereinafter referred to as "positive." Relay 307 operates over this circuit and locks itself in operated position independently of limit switch 270 over a circuit from negative through break contact spring 313 of relay 306 through spring 314 and its make contact of relay 307, conductor 311, through the winding of relay 307 to positive. At spring 315 relay 307 closes a circuit from positive on conductor 312 through the winding of thruster 166 to negative, whereupon the thruster operates to move its rod 162 to the left, Figure 3, thereby rotating shaft 147 counter-clockwise to operate clutch 14 to establish a driving connection from the motor to the machine. As previously explained, the clutch is first operated with light pressure so that the plates slip slightly to bring the machine up to running speed more slowly and thereafter completely operates the clutch latching link 158 over pawl 159 to retain the clutch in operated position. This counterclockwise rotation of shaft 147 puts tension on the lower run of chain 145 and spring 148 gives. Shaft 130 and the hand lever 131 thereon are not moved during this movement of shaft 147. Slack is built up in the upper run of chain 145 so that when latch 159 is released and shaft 147 returned to normal, shaft 130 still remains stationary.

Movement of limit switch spring 270 away from its break contact removes the negative from holding conductor 316 thereby restoring to normal all relays which were locked in operated position over circuits extending through this conductor, as will presently appear.

Relay 305 is thereby restored to normal and at spring 317 closes a circuit from positive on conductor 312 through the winding of solenoid 205 to negative, operating that solenoid which moves the apron 10 into threading position. Restoration of relay 305 at spring 317 opens the circuit of solenoid 190 permitting that solenoid to restore and thereby move pawl 96 into the path of cam 95 on the mandrel. As the machine starts, the mandrel rotates sufficiently to bring the cam into engagement with the pawl and is then stopped and at this time one of the slots 80 in the mandrel will be aligned with the edge of the apron so that the web moved forward by the feed rolls of the machine will be inserted in the slot 80.

Restoration of relay 306 at spring 318 opens the circuit of solenoid 260 permitting that solenoid to restore, thereby freeing pawl 224 so that spring 261, Figure 12, may raise the pawl out of the path of stop block 233 on cam 222. The forward movement of the web rotates the measuring wheel 6 and with it the shaft 215, thereby to rotate the cam assembly containing cams 222 and 225 in a clockwise direction, as indicated by the arrow in Figure 12.

As soon as the web strikes the bottom of the slot 80, its forward movement will cause the formation of a loop and cam 225 is adjusted by moving it with respect to cam 222 so that the rotation of this cam will operate limit switch 234 at the instant that the loop in the web is of proper size to permit starting a roll.

The operation of limit switch 234 closes a circuit from negative through the winding of relay 305 to positive on conductor 312, relay 305 operating and locking itself in operated position independently of switch 234 to negative on holding conductor 316, through spring 319 and its make contact. The operation of relay 305 moves spring 317 away from its break contact, thereby to open the circuit of solenoid 205 which permits the apron 10 to fall back into its normal position. Spring 317 on moving into engagement with its make contacts closes the circuit hrough solenoid 190 operating that solenoid to remove pawl 96 from the path of cam 95, thereby freeing the mandrel for rotation.

Winding of the roll on the mandrel continues, shaft 215 revolving cams 248 and 249 in a counter-clockwise direction, these cams making one revolution during the winding of the complete roll on the mandrel. As the roll is building up, cam 249 moves so that the roller 254 of limit switch 253 moves off of the hill of this cam, thereby operating the limit switch 253 to move its main spring away from its normally closed contact and into engagement with its normally open contact, thereby closing a circuit from positive through conductor 320, through the winding of relay 304 to negative on holding conductor 316. Relay 304 locks itself to positive on conductor 312, through spring 321 and at spring 322 prepares a point in the circuit of relay 303, which circuit is incomplete at the moment since limit switch 253 is moved away from its normally closed contact.

Rotation of cam 248 in a counter-clockwise direction moves the roller of 256 of limit switch 255 off of the hill of the cam with which it is shown in engagement in Figure 12 into the valley of the cam, thereby operating limit switch 255 away from its normally closed contact and into engagement with its normally open contacts, thereby closing a circuit from positive through the limit switch over conductor 323 through the winding of relay 302 to negative on conductor 316. Relay 302 operates over this circuit and locks itself to positive on conductor 312 through spring 324 and at spring 325 prepares a point in the circuit of relay 301, which circuit is incomplete at the moment since limit switch 255 is in engagement with its normally open rather than its normally closed contacts at the moment.

During the winding of the roll, cam 222, Figure 12, moving in a clockwise direction engages the roller 232 of limit switch 231 when the length of web on the roll is a little more than half of the shortest length that the machine is designed to wind. This engagement of the hill of the cam with the roller 232 operates limit switch 231 thereby closing a circuit from negative on conductor 316 through conductor 330 through the winding of relay 306 to positive, relay 306 operating and at spring 331 locking itself to conductor 316 independently of the limit switch. Relay 306 upon operating at spring 313 opens a locking circuit of relay 307 thereby permitting that relay to restore and at spring 315 opens the circuit of thruster 166 without effect at the moment since the main clutch is latched in posigedly built at a moderate cost and when equipped with low friction bearings properly encased and supplied with lubricant is capable of running for a long period of time with a minimum of maintenance. Through its fully automatic operation, the machine has no difficulty in keeping up with the roofing machines now in use even when those machines are running at their maximum capacity. Since the manual work required of the operator is reduced to an absolute minimum, one operator is all that is required to handle the machine rather than two or more as has been the case with the winding machines of the prior art. Since the time required to sever the finished roll from the web and remove the same from the machine is minimized, web speed can be reduced and still the winder can keep up with the roofing machine, with the result that there is less damage to the roofing material and less spoilage thereof.

Throughout the foregoing description, the term roofing material has been applied to the web being wound into rolls by the machine. This description applies to but one of the many uses to which the machine may be put as other materials such as wrapping paper, building paper and felts may be made into rolls by the machine within the teachings of the invention.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. In a winding machine, means for feeding and winding a web of material into a roll, a source of power, a clutch, means for operating said clutch to establish a driving connection between said source of power and said machine, electro-magnetically controlled means for actuating said clutch operating means, stripper means for removing a finished roll from said machine, and an electric switch operated by said stripper means for closing a circuit over which said electro-magnetically controlled means is actuated to start said machine.

2. In a winding machine, means for feeding and winding a web of material into a roll, a source of power, controllable means for establishing a driving connection between said source of power and machine, a knife, means including a slip clutch for operating said knife from said source of power to cut a finished roll from said web, stop means engaging said knife to hold the same inoperative, an electro-magnet, a switch for closing a circuit for said electro-magnet to operate said stop means to free the knife, a cam, and means for rotating said cam at a speed proportional to the speed of said web to operate said switch to close said circuit after a certain length of web has been wound into the roll.

3. In an automatic winder for rolling up a web of material, a mandrel on which the web is rolled, a pair of feed rolls for feeding the web to the mandrel, a source of power, clutch means for connecting said source of power to said feed rolls and mandrel to drive the same, a knife, means including a slip clutch for connecting said knife to said source of power, lock means for holding said knife, a measuring wheel engaging said web, and means controlled by said measuring wheel for operating said lock means to release said knife to sever the web and for operating said clutch means to disengage said source of power from said mandrel and feed rolls.

4. In a winding machine, means for feeding and winding a web of material into a roll, a source of power, a clutch, means for operating said clutch to establish a driving connection between said source of power and said machine, means for maintaining said clutch in operated position to maintain said driving connection, an electro-magnet for releasing said maintaining means thereby to release said clutch and stop the machine, electro-magnetically controlled means for actuating said clutch operating means, stripper means for removing a finished roll from said machine, means for operating said stripper means, an electro-magnet for controlling said latter means, a switch, means for operating said switch when a certain amount of web has been wound in a roll to close a circuit for said electro-magnets to operate them and thereby stop said machine and start said stripper means to remove the finished roll from the machine, a second switch, and means on said stripper means for operating said second switch thereby to close a circuit for said electro-magnetically controlled means to actuate said clutch operating means to restart said machine.

5. In a winding machine in which a web of material is pulled by feed roll means and wound on a mandrel to form a roll, a source of power, clutch means for establishing a driving connection between said source of power and machine to drive said feed roll means and mandrel, means for operating said clutch to establish said connection, latch means for maintaining said clutch operated to maintain said connection, a cam, means for rotating said cam at a speed proportional to the speed of travel of the web through the machine, an electric switch operated by said cam, electro-magnetic means operated over a circuit closed by said switch for operating said latch means to release said clutch and stop said machine, a knife for severing said web, means for operating said knife, means connecting said clutch operating means to said clutch, stop means for holding said knife in its non-operated position, an electro-magnet for operating said stop means to free said knife, a second switch, a circuit for said electro-magnet closed by said second switch to operate the electro-magnet, a second cam for operating said second switch, means for moving said cam with said first cam, and means for moving said second cam with respect to the first cam to vary the time of operation of said second switch with respect to the operation of said first switch thereby to vary the time of operation of said knife with respect to the operation of said clutch to stop said machine.

6. In a winding machine, means for feeding and winding a web of material into a roll, a source of power, a clutch, means for operating said clutch to establish a driving connection between said source of power and said machine, electro-magnetically controlled means for actuating said clutch operating means, means for holding said clutch in operated position to maintain said driving connection, an electro-magnet for releasing said clutch holding means, thereby to release said clutch and stop the machine, a knife for severing a completed roll from said web, driving means for said knife, including a slip clutch, means for holding said knife in a normal position, a second electro-magnet for operating said knife holding means to release the knife and thereby sever the web, stripper means for removing a finished roll from the machine, driving means for said stripper means, electro-magnetically operated means for controlling said stripper driving means, an electric switch, means moved proportionally to the movement of the web through the machine for operating said electric switch, circuit means closed by said electric switch for operating said first electro-magnet to release said clutch and thereby stop the machine and for operating said latter electro-magnetically operated means to initiate an operation of said stripper means, a second electric switch, means for operating said switch, circuit means controlled by said second switch for operating said second electro-magnet to release said knife to sever the web, a third electric switch, means on said stripper for operating said third electric switch, and circuit means controlled through said third electric switch for operating said first electro-magnetically operated means thereby to operate said clutch operating means to restart said machine.

7. The combination with a winding machine in which a web of material is pulled through the machine by a pair of driving rolls and wound on a mandrel to form a roll which is cut from the web by a power driven knife and the roll removed from the mandrel by a power driven stripper of a control mechanism comprising, a main clutch for connecting the machine to a source of power, a measuring wheel engaging the web and rotated thereby, cam means rotated by said measuring wheel, electro-magnetic means for operating said clutch to disengage the same to stop the machine, switch means for controlling said electro-magnetic means actuated by said cam means, a slipping clutch for driving said knife, electro-magnetically operated means for holding said knife inoperative, switch means for controlling said holding means actuated by said cam means to operate the holding means to free the knife for operation through said slipping clutch to sever the web, a single revolution clutch for operating the stripper to remove the finished roll from the mandrel, electromagnetically operated means for tripping said single revolution clutch, switch means operated by said cam means for actuating said clutch tripping means, electro-magnetic means for operating said main clutch to connect the machine to said source of power, switch means actuated by said stripper as the finished roll leaves the mandrel for operating said last clutch operating means to restart the machine, means for starting a new roll on said mandrel, and electro-magnetic means operated by said last named switching means for operating said roll starting means.

8. In a winding machine in which a web of material is pulled by a pair of driving rolls and fed thereby through the machine, a mandrel, a source of power, a clutch, means for operating said clutch to establish a driving connection between said source of power and said driving rolls and mandrel, electromagnetically controlled means for actuating said clutch operating means, stripper means for removing a finished roll from said machine, means for guiding the web, means for holding the mandrel in a predetermined position with respect to said guiding means, means on the mandrel for engaging the end of the web as the same is moved forwardly by said driving rolls to start a new roll, electromagnetic means for operating said mandrel holding means, electro-magnetic means for operating said guiding means, an electric switch operated by said stripper for closing circuits over which said clutch operating means is operated to start the machine and for operating said mandrel holding means to hold the mandrel and for operating said guide means to start a new roll.

9. In an automatic machine for winding a web of material into rolls, a mandrel, power means for driving said mandrel to wind the web thereon, a rotatable knife movable in the same direction as the web at slightly higher speed to sever the web to end a roll on the mandrel, power means for rotating said knife, control means for bringing said machine to rest, means in said control means for initiating an operation of said knife driving means while said machine is coming to rest, stripper means for moving a finished roll longitudinally of the mandrel to remove the same from the machne, power driven means for operating said stripper means, and means in said control means for initiating an operation of said stripper driving means.

10. In a winding machine in which a web of material is pulled by feed roll means and wound on a mandrel to form a roll, a source of power, a clutch, means for operating said clutch to connect said source of power to said machine to drive said feed roll means and mandrel, electromagnetically controlled means for actuating said clutch operating means, latch means for holding said clutch in operative position to maintain the connection between the machine and source of power, electromagnetically controlled means for operating said latch means to break said connection, a measuring wheel engaging the web and rotated thereby, a cam operated by said measuring wheel, a switch operated by said cam, stripper means for removing a finished roll from said machine, electromagnetically operated means for initiating an operation of said stripper means, circuit means controlled by said cam operated switch for operating said electromagnetically controlled latch means and said electromagnetically controlled stripper operating means, a switch controlled by said stripper means, and circuit means closed through said latter switch for operating said electromagnetically controlled means for actuating said clutch to re-connect said source of power to said machine.

CARL C. WESTERGAARD.